US009706406B1

(12) United States Patent
Adams et al.

(10) Patent No.: US 9,706,406 B1
(45) Date of Patent: Jul. 11, 2017

(54) SECURITY MEASURES FOR AN ELECTRONIC DEVICE

(71) Applicant: Amazon Technologies, Inc., Reno, NV (US)

(72) Inventors: Jeffrey Penrod Adams, Tyngsborough, MA (US); Ryan Paul Thomas, Redmond, WA (US); Bjorn Hoffmeister, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 856 days.

(21) Appl. No.: 13/747,245

(22) Filed: Jan. 22, 2013

(51) Int. Cl.
*H04W 12/06* (2009.01)
*H04W 12/08* (2009.01)

(52) U.S. Cl.
CPC .................. *H04W 12/08* (2013.01)

(58) Field of Classification Search
CPC ....... H04W 12/06; H04W 88/02; G06F 21/36; G06F 21/32
See application file for complete search history.

(56) References Cited

U.S. PATENT DOCUMENTS

2013/0097683 A1* 4/2013 Davis et al. .................. 726/7
2013/0191908 A1* 7/2013 Klein .............................. 726/18

\* cited by examiner

*Primary Examiner* — Nathan Mitchell
*Assistant Examiner* — Dung Lam
(74) *Attorney, Agent, or Firm* — Polsinelli LLP

(57) ABSTRACT

Approaches are described for detecting when an electronic device (such as a mobile phone) has been stolen or is otherwise being used by someone other than an authorized user of the device. At least one sensor of the device can obtain data during a current use of the device, and the device can determine from the data a set of available features. The features can be compared to a corresponding model associated with an owner (or other authorized user) of the device to generate a confidence value indicative of whether the current user operating the device is likely the owner of the device. The confidence value can be compared to at least one confidence threshold, for example, and based on the comparison, the current user can be provided access to at least a portion of functionality of the device and/or a security action can be performed when the confidence value does not at least meet at least one confidence threshold.

24 Claims, 7 Drawing Sheets

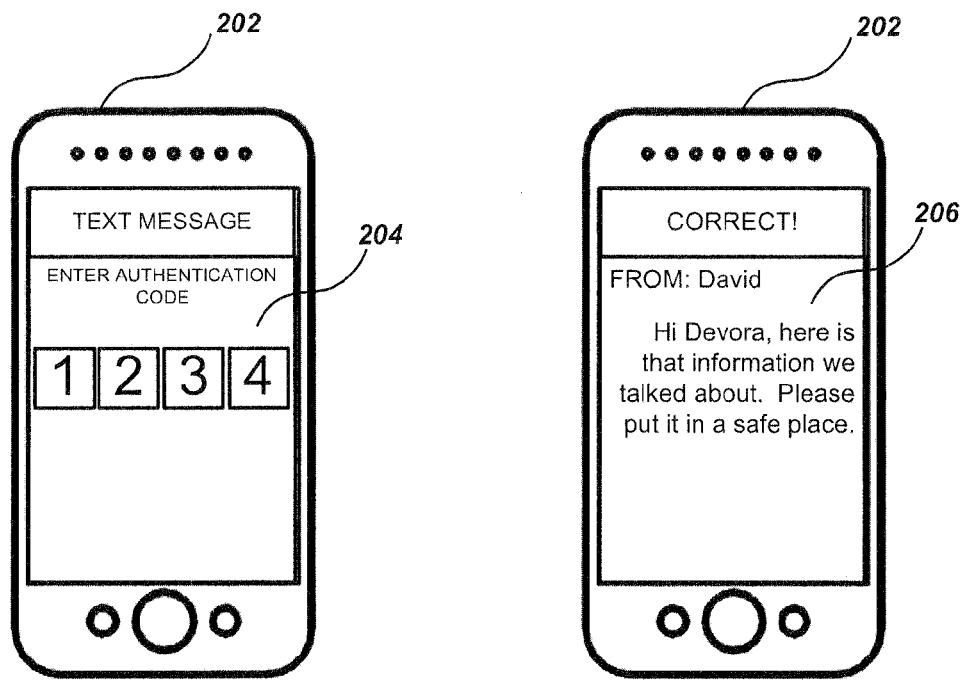
FIG. 2A
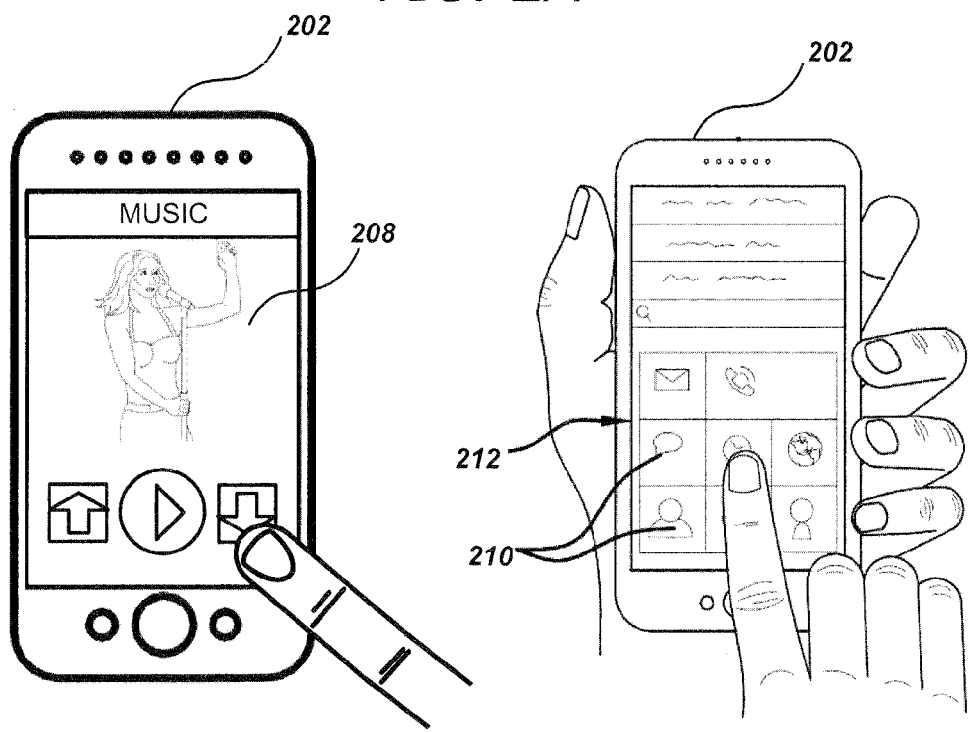
FIG. 2B                    FIG. 2C

SECURITY MEASURES FOR AN ELECTRONIC DEVICE

BACKGROUND

As computing devices offer increasing processing capacity and functionality, users are able to operate these devices in an expanding variety of ways. For example, users can utilize the multiple input sensors of the device, such as a touch screen, camera, microphone, GPS, etc., to capture images; obtain driving directions; maintain financial, personal and/or private records; among others. As such, these devices are increasingly important to their owners and detecting when such a device is stolen is tantamount in preventing financial loss or loss of personal/private information. Unfortunately, conventional devices are not able to determine when the device has been stolen, or whether use of the device is suspicious and further use should require some type of verification action.

BRIEF DESCRIPTION OF THE DRAWINGS

Various embodiments in accordance with the present disclosure will be described with reference to the drawings, in which:

FIGS. 2A-2C illustrate example situations of providing a user with access to at least a portion of functionality of a computing device and/or performing a security action, in accordance with an embodiment;

DETAILED DESCRIPTION

Figure 1A:
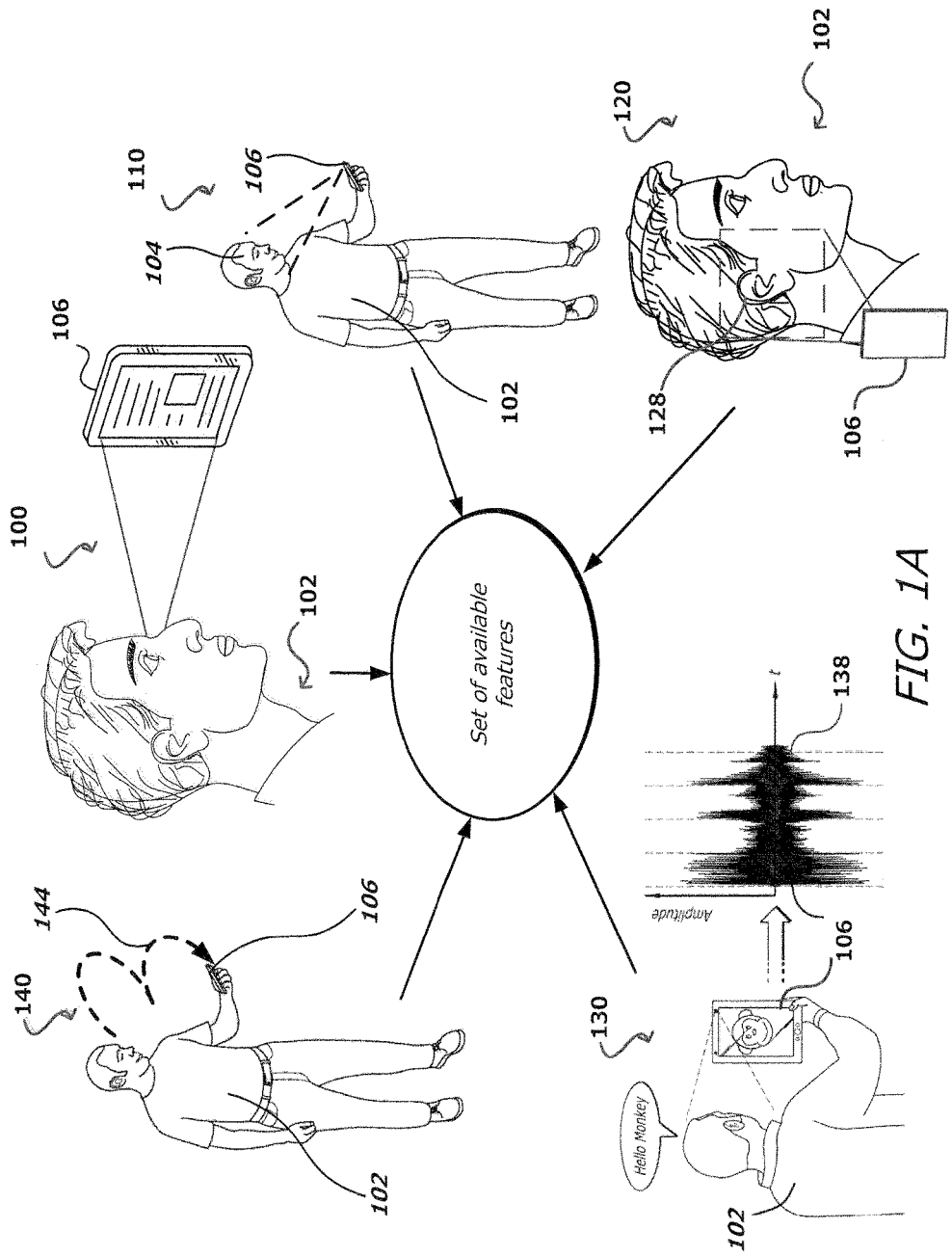
FIGS. 1A-1B illustrate a set of potential features that can be used to determine a likelihood that a current user operating the device is an owner (or a recognized user) of the device, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for detecting when an electronic device has been stolen or is otherwise being used by someone other than an owner of the device. In particular, various embodiments enable a computing device (e.g., a mobile phone, tablet computer, etc.) or other electronic device to determine whether a user that is currently utilizing the device is the owner of the device, or an authorized user of the device, for example, and based at least in part upon the determination, provide access to at least a portion of functionality of the device and/or perform a security action (such as locking the device).

For example, one or more sensors (e.g., a touchscreen, a camera, a microphone, a GPS component, a proximity sensor, an accelerometer, etc.) of a mobile device can obtain data during a current use of the device, and the device can determine from the data a set of features (such as a feature vector). The features can be compared to a model associated with an owner (or other authorized user) of the device to generate a confidence value (or other score) indicative of whether the current user operating the device is likely the owner of the device. The confidence value can be compared to at least one confidence threshold, for example, and based on the comparison, the current user can be provided access to at least a portion of functionality of the device and/or a security action (such as disabling the device, sending an email to the owner of the device, calling another phone number, requiring the current user to enter a passcode, among others) can be performed when the confidence value does not at least meet at least one confidence threshold. In at least some embodiments, the type of access granted and/or security action performed can correspond to the determined confidence value and/or the confidence thresholds that were, or were not, met. For example, a confidence value meeting a highest threshold might be granted full access with no security action taken, while a confidence value meeting a lower threshold might have some access granted with a type of security action taken, while a confidence value not meeting any of these thresholds might result in a user being locked out of a device or another such action taken.

Various other functions and advantages are described and suggested below as may be provided in accordance with the various embodiments.

As mentioned above, portable computing devices (such as mobile phones) are increasingly important to their owners, and detecting when such a device is stolen is tantamount in preventing further loss of information. Conventionally, mobile devices can be secured with a passcode, which can be used to prevent unauthorized use of the device. In other situations, applications (or device settings) can be used to encrypt or otherwise protect information stored on the device. However, in some instances, the owner of the device may not have enabled the passcode or other such preventive security measure, or the owner of the device may not have encrypted their personal and/or private information. In other instances, the owner of the device may have let a family member, friend, or other person borrow and/or temporarily use the device, and may not want the user to have access to all functionality of the device. In accordance with various embodiments, systems and methods described herein enable a computing device to determine whether a user currently utilizing the device is the owner of the device, or an authorized user of the device, for example, and based on the determination, provide access to at least a portion of functionality of the device and/or perform a security action.

Figure 1B:
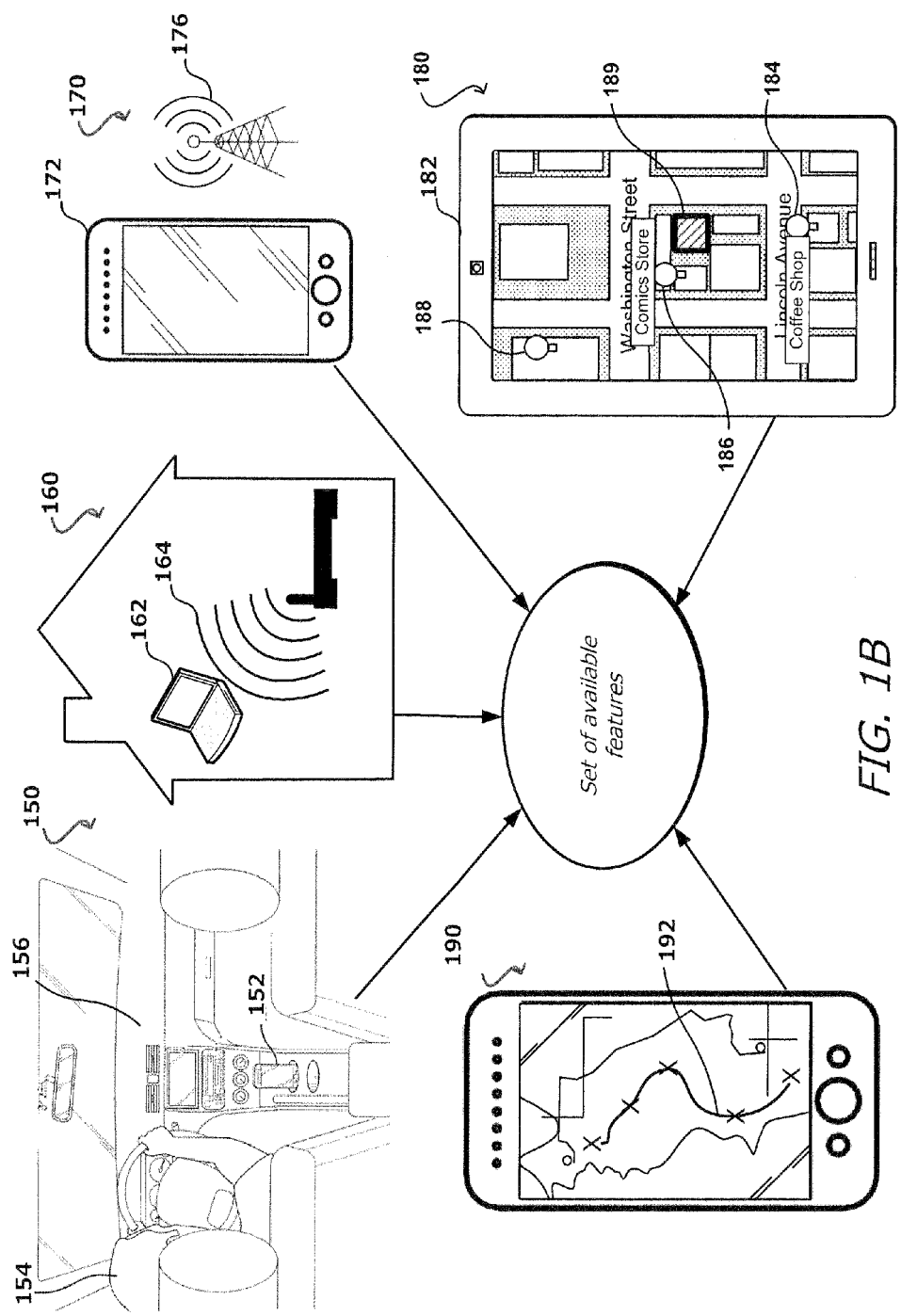

FIGS. 1A-1B illustrate a set of potential data sources that can be used to determine a likelihood that a current user operating the device is an owner (or an authorized user) of the device, in accordance with an embodiment. It should be noted that in some embodiments an owner of a device and an authorized user of a device can be used interchangeably, while in other embodiments, an owner of a device can allow for one or more authorized users of the device.

As described above, device sensors can collect sensor data, where a set of features (herein also known as feature vectors) can be derived from the sensor data. As described in further detail below, the set of features can at least be used to determine a likelihood that a current user operating the device is an owner (or an authorized user) of the device, and can further be used to modify a model associated with the user to reflect the user's use and/or change in use. FIG. 1A illustrates example features derived from sensor data associated with characteristics of a user, such as the user's voice, an image of the user's face, ear; etc. FIG. 1B illustrates example features derived from sensor data associated with the user's surroundings and/or location, such as device location as determined by GPS, the look of the inside of the user's car, house, etc. In any situation, the sensor data is processed to determine the features, where in some situations, the sensor data is the feature without any significant processing, and in other situations, the sensor data is processed to determine other features. For example, location data indicative of a location can be a feature, and the location data can be processed to determine other features, such as average distance between locations, average time between traveling to different locations, among others.

Turning to FIG. 1A, in situation 100, a high resolution camera or other sensor of computing device 106 obtains image or video data of an eye of owner 102 (or other authorized user), such as data relating to the owner's retina and/or iris. In this example, the data can be the image of the retina/iris, and the features can be relevant information extracted from the image, such as a "fingerprint" representative of image. The device can include algorithms, such as retina and iris recognition algorithms, which can be used to recognize the owner based on digitally represented images of the owner's eye. That is, the algorithms can be used by the device to analyze the image or video data to generate the "fingerprint" indicative of the owner's eye. The fingerprint can be included in the model associated with the owner of the device as at least one feature indicative of the owner. Thereafter, at least a current feature indicative of the current user's eye can be compared to a corresponding model, and the result along with other comparisons using other features (if available) can be used in the determination of whether the user currently utilizing the device is the owner (or an authorized user) of the device.

In situation 110, a high resolution camera or other sensor of computing device 106 obtains image or video data of the owner' face. In this example, the data can be the image of the user's face, and the features can be relevant information extracted from the image, such as a "fingerprint" representative of some aspect of the user's face (e.g., the shape, eye placement, etc.). The device can include facial or feature recognition algorithms, which can be used to recognize the owner 102 based on digitally represented images of the owner's face 104. As described with reference to the owner's eye, the algorithms can be used by the device to analyze the image or video data to generate the "fingerprint" indicative of the owner's face, and the fingerprint can be included in the model of features associated with the owner of the device as at least one feature indicative of the owner. Thereafter, a current feature indicative of the current user's face can be compared to a corresponding model, and the result along with other comparisons using other features (if available) can be used in the determination of whether the user currently utilizing the device is the owner (or an authorized user) of the device.

In situation 120, a high resolution camera or other sensor of computing device 106 obtains image or video data of the owner' ear 128. In this example, the data can be the image of the ear, and the features can be relevant information extracted from the image, such as a "fingerprint" representative of the (e.g., the shape, size, etc.). Additionally or alternatively, an imprint of the owner's ear can be obtained when the owner's ear is pressed against the touchscreen of the device, such as in the situation where the user is talking on the device. In any situation, the device can include feature recognition algorithms, which can be used to recognize the owner based on digitally represented images of the owner's ear. As described herein, the algorithms can be used by the device to analyze the image, video or imprint to generate the "fingerprint" indicative of the owner's ear, and the fingerprint can be included in the model associated with the owner of the device as at least one feature indicative of the owner. Thereafter, a current feature indicative of the current user's ear can be compared to a corresponding model, and the result along with other comparisons using other features (if available) can be used in the determination of whether the user currently utilizing the device is the owner 102 (or an authorized user) of the device.

In situation 130, a microphone of computing device 106 obtains an input audio signal generated by the owner of the device such as when the owner 102 is speaking into the device (e.g., during a phone call, voice memo, etc.). In this example, the data can be the input audio signal, and the features can be relevant information extracted from the input audio signal, such frequency distributions, sound wave forms, etc., which can be used to generate a "fingerprint" indicative of a relevant feature. The input audio signal 138 can be captured at an audio input component of the device, such as a microphone coupled to an analog-to-digital (A/D) converter. The microphone can be configured to receive the input audio signal while the A/D converter can sample the input audio signal to convert the signal into a digital audio signal suitable for further processing. For example, the input audio signal can be transformed from the time domain into another domain, e.g., the frequency domain using a fast Fourier transform (FFT) or other operation, to generate one or more digital audio signal segments, where each segment can correspond to a determined or variable window of time. In other embodiments, the input audio signal can be analyzed in the time domain. The digital audio signal segments (in any domain) can be representative of a set of speech samples (such as vowel sounds) that occur sequentially in time, where each speech sample can be identified by a frequency distribution, pattern or shape. The frequency distribution, pattern or shape can be used to generate the "fingerprint" indicative of the owner's voice, and the fingerprint can be included in the model of features associated with the owner of the device as at least one feature indicative of the owner. Thereafter, a current feature indicative of the current user's voice can be compared to a corresponding model, and the result along with other comparisons using other features (if available) can be used in the determination of whether the user currently utilizing the device is the owner (or an authorized user) of the device.

In situation 140, a proximity sensor and/or accelerometer of computing device 106 obtains handling data or other operational use data of the device. For example, the accelerometer can be used to determine how the owner stores the device, e.g., in a pocket (left, right, front, back, shirt, pant, etc.), bag, on a table; gestures 144 the user makes when operating the device, such as the path the device takes in the situation of answering a call, among others. The proximity sensor can be used to determine how the owner holds the phone, e.g., against the left or right ear when talking on a call; how close the device is relative to the owner when the owner is looking at and/or operating the device, among others. In any situation, a model or metric representing each usage can be determined, and each metric can be included in the model associated with the owner of the device as at least one feature indicative of the owner. Thereafter, a current feature indicative of handling data of the current user can be compared to a corresponding model, and the result along with other comparisons using other features (if available) can be used in the determination of whether the user currently utilizing the device is the owner (or an authorized user) of the device.

It should be noted that situations 100, 110, 120, 130 and 140 are example situations of deriving feature or feature vectors from sensor data obtained from device sensors, and that other features or feature vectors can be determined from the same (or different) sensors.

For example, a touchscreen can be used to obtain touch data indicative of an owner of the device, such as an amount of pressure used when handling the device, a number of fingers used when performing gestures on the touchscreen of the device, typical swipes patterns (such as vertical or horizontal swipes) used when operating the device, etc. Additionally, as described, touch data can include an imprint of the owner's ear, which can be obtained when the owner's ear is pressed against the touchscreen of the device (or can be obtained by a camera of the device as the device is brought to the owner's ear). The touch data can be used to generate metrics indicative of how the user holds and/or touches the device, and the metrics can be included in the model associated with the owner of the device as at least one feature indicative of the owner (or an authorized user). Thereafter, a current feature can be compared to a corresponding model, and the result along with other comparisons using other features (if available) can be used in the determination of whether the user currently utilizing the device is the owner of the device.

In accordance with various other embodiments, a feature can be determined from the charging patterns of the device, such as from a log or records of the battery level of the device. In this situation, the battery level and or charging patterns of the device can indicate whether the device is charged at night, during the day, or at other times (such as when the charge level drops below thirty percent). The charging patters can be used to generate a metric indicative of charging patterns, and the metric can be included in the model associated with the owner of the device as at least one feature indicative of the owner (or an authorized user). Thereafter, a current feature can be compared to a corresponding model, and the result along with other comparisons using other features (if available) can be used in the determination of whether the user currently utilizing the device is the owner of the device.

Additional features can include actual usage or operation use of the device, such as who is being called, applications used, new applications added, deletion of data, purchase history, etc. Operation use can be used to generate metrics indicative of how the device is used and can be included in a model associated with at least an authorized user of the device.

In addition to the features related to an owner of a device (such as the user's voice; an image of the user's face, ear; etc.), other features can be determined that relate to the owner's surroundings and/or location. For example, FIG. 1B illustrates situations 150, 160, 170, 180, and 190, where a feature related to the owner's surroundings and/or location is derived from sensor data. As shown in situation 150, the device 152 is positioned in the owner's automobile. A high resolution camera or other sensor of device obtains image or video data of the owner's 154 automobile 156. The device can include feature recognition algorithms, which can be used to recognize the surrounding as the owner's automobile based on digitally represented images of the surroundings. The algorithms can be used by the device to analyze the image or video data to generate a "fingerprint" indicative of the owner's automobile, and the fingerprint can be included in the model associated with the owner of the device as at least one feature indicative of the owner (or an authorized user). Thereafter, a current feature indicative of the current user's automobile can be compared to a corresponding model, and the result along with other comparisons using other features (if available) can be used in the determination of whether the user currently utilizing the device is the owner of the device.

In situation 160, the device 162 is receiving a wi-fi signal 164 belonging to the owner. In other situations, the wi-fi signal can belong to someone other than the owner, and the owner may or may not have previously connected to that wi-fi signal. In any situation, known wi-fi signals (and unknown) can be used to indicate whether the device is in the owner's possession. For example, each time the device connects to a wi-fi signal, the signal can be included in the model associated with the owner of the device as at least one feature indicative of the owner. Thereafter, a current feature can be compared to a corresponding model, and the result along with other comparisons using other features (if available) can be used in the determination of whether the user currently utilizing the device is the owner of the device. For example, connecting to a known wi-fi signal can indicate that the device is in the owner's possession, while connecting to an unknown signal can indicate that the device is not in the owner's possession.

In situation 170, the device 172 is receiving a mobile network signal 176, where the mobile network signal can be used to indicate whether the device is in the owner's possession. For example, similar to as described above, each time the device connects to a mobile network, the mobile network signal can be included in the model associated with the owner of the device as at least one feature indicative of the owner. Thereafter, a current feature can be compared to a corresponding model, and the result along with other comparisons using other features (if available) can be used in the determination of whether the user currently utilizing the device is the owner of the device. For example, connecting to a known mobile network signal can indicate that the device is in the owner's possession, while connecting to an unknown mobile network signal can indicate that the device is not in the owner's possession.

In situation 180, the GPS component of the device 182 can be used to determine one or more locations the device has been, such as locations 184, 186, 188 and 189. The locations can be indicative of places or areas that the owner visits. For example, the owner may visit a particular coffee shop or comic book store, and the various locations can be included in the model associated with the owner of the device as at least one feature indicative of the owner. Thereafter, a current feature can be compared to a corresponding model, and the result along with other comparisons using other features (if available) can be used in the determination of whether the user currently utilizing the device is the owner of the device. For example, determining that the device is in a known location can indicate that the device is in the owner's possession, while determining that the device is in an unknown location can indicate that the device is not in the owner's possession.

Similarly, in situation 190, the GPS component can be used to determine other locations, such as locations within or across a city, state, country, etc. As shown in situation 190, the device locations include locations 192, which can be locations across a state. The locations can be included in the model of associated with the owner of the device as at least one feature indicative of the owner. Thereafter, a current feature can be compared to a corresponding model, and the result along with other comparisons using other features (if available) can be used in the determination of whether the user currently utilizing the device is the owner of the device. For example, if the user only travels within a certain state, any location data within that state can indicate that the device is in the owner's possession. In the situation where device is located outside the state, e.g., by more than a threshold distance, then this location may be indicative that the device is not in the owner's possession.

As described above, FIGS. 1A-1B illustrate a set of features that can be used to determine a likelihood that a current user operating the device is an owner (or a recognized user) of the device. In accordance with an embodiment, the number of features included in the set of features can depend on a number of factors, such as the number of sensors available on the device, the number of features capable of being derived from available sensor data, user permission to collect certain data, etc. Accordingly, the number of features can be different for devices having different sensors, such as in the case of a device having more, fewer, or different sensor types. In any situation, the features derived from the sensor inputs are compared against a corresponding model, where thereafter, a current user can be provided access to at least a portion of functionality of the device and/or a security action.

FIGS. 2A-2C illustrate example situations of providing a user with access to at least a portion of functionality of a computing device and/or performing a security action, in accordance with an embodiment. It should be understood that determining whether to provide a user with access to at least a portion of functionality of a computing device and/or performing a security action can include using features that have been obtained over a period of time as opposed to a snapshot in time. For example, in determining whether the device is stolen, features can be used that were obtained over the last five minutes, hour, day, etc., because, for example, some information may be more meaningful when considered over a time period as opposed to a snapshot in time. In other situations, the device can undergo a minimum training period (such as a day), before performing a security action and/or limiting access to the device. During the training period, a default model (and/or sub models) can be tailored to the owner. Additionally, during the training period, certain information useful in distinguishing the owner from other users of the device can be obtained, such as image data, voice data, responses to secret questions, a pin code, among others.

As described above, features derived from sensor data can be used to determine whether a current user utilizing the device is the owner (or authorized user) of the device. For example, the features can be compared against corresponding model data associated with at least one authorized user of the device to generate a confidence value (or other score) indicative of a likelihood that the current user operating the device is an authorized user (such as an owner) of the device. The confidence value can be compared to a number of confidence thresholds, where the current user can be provided access to at least a portion of functionality of the device in response to the confidence value at least meeting a first confidence threshold, and/or a security action can be performed when the confidence value does not at least meet a second confidence threshold.

For example, as shown in FIG. 2A, a security action is being performed in response to determining that the confidence value does not at least meet a specified confidence threshold (such as a second confidence threshold). In the illustrated embodiment, a device 202 is locked, and the current user is prompted 204 to enter an authorization credential, such as a pin code, for example, to unlock the device. If the correct pin code is entered, the user is able to access the device, e.g., to access a received text message 206. In this way, if the device had been stolen, the user's personal and/or private data can be protected by requiring a passcode to continue use of the device.

In accordance with an embodiment, other security actions can be performed along with (or separate from) requiring a passcode. For example, an email, text, or other notification can be sent to the owner of the device. In other embodiments, instead of requiring a pin code, the device can attempt to verify the current user of the device through any number of other verification methods, such as through biometric verification, image verification, gesture verification, etc. For example, the current user can be prompted to speak a verification phrase into the device, such as to verify the user based on the correct verification phrase and/or through speech recognition; pose for a picture, such as to verify the user using image recognition analysis, etc. It should be noted that any security measure can be implemented, and the examples provided are not to be taken as limiting.

Upon successfully responding to the security action, the user can be granted access to at least some level of functionality of the device; otherwise, the user is granted no access to the device. The level of access granted to the user can be based on the response to the security action. For example, if the user is authenticated using a picture, voice, or biometric data, then the user may be granted full access to the device since this information can be used to determine with a high level of certainty that the user is an authorized user of the device. However, if the user is authenticated by entering a passcode, then the user may be granted a lower level of access until the device can further authenticate the user as an authorized user of the device. The user can be further authenticated by providing additionally identifying information, such as image or voice data, answer a secrete questions, or in some other manner.

FIGS. 2B-2C illustrates example situations of providing a user with access to at least a portion of functionality of a computing device in response to determining that the confidence value at least meets a first confidence threshold, such as a highest threshold. Providing access to a portion of functionality can include, e.g., granting access to certain data stored on the device, granting access to certain programs on the device, etc. In the case where the user is granted full access, the user can access all functionality of the device. In the case where the user is granted partial access, the user may be able to access certain features or applications of the device, such as a phone application to make a call, but may not be able to access other features or applications of the device, such as system preferences, a photo application, etc.

For example, in FIG. 2B, the user is granted full access to the device with no security action being taken. In the illustrated embodiment, the current user is accessing a music rating application 208, and because the user has full access to the device, the user can access other applications and or data stored on the device. For example, as shown in FIG. 2C, the user is accessing a phone book application 212, where the user can access a number of a number settings 210, or other personal and/or private data.

In some embodiments, the user may notice they have not been granted full access (but feel they should have full access to the device), because, for example, the user is operating the device in a manner that is not consistent with previous use or the user is otherwise misidentified (e.g., because the user has a cold or has otherwise altered their appearance). In such a case, the user can provide authentication information, such as an answer to a secret question, image data, sound data, or some other authentication information to verify the user as an authorized user. Thereafter, the user can be granted full access to the device.

Figure 3:
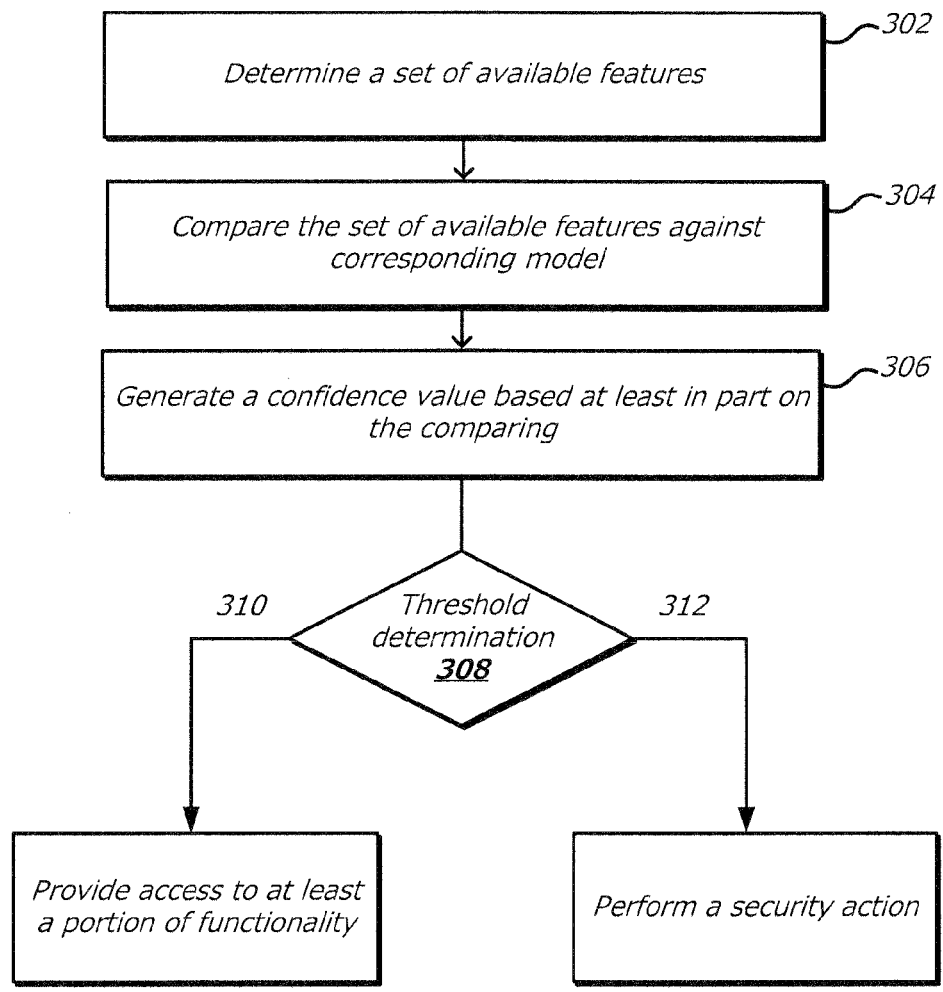
FIG. 3 illustrates an example process for providing a user with access to at least a portion of functionality of a computing device and/or performing a security action, in accordance with various embodiments.

FIG. 3 illustrates an example process for providing a user with access to at least a portion of functionality of a computing device and/or performing a security action, in accordance with various embodiments. It should be understood that, for any process described herein, that there can be additional or fewer steps performed in similar or alternative orders, or in parallel, within the scope of the various embodiments unless otherwise stated. In step 302, a set of features is determined from sensor data captured using at least one sensor of a computing device. The sensor can be, e.g., one of a touch screen, a camera, a microphone, a proximity sensor, an accelerometer, an ultra sound sensor, IR sensor, barometer, etc. The sensor data can be the data obtained from the sensors. By example, sensor data can be touch patterns or other patterns made by a user when touching the touch screen, image data obtained by a camera of the device, etc. The set of available features (also known as feature vectors) can be features derived from the sensor data. For example, image data obtained from a sensor (e.g., a camera) can be processed to determine one or more features, such as ear imprint, eye, face, etc. In other situations, the data obtained can be the feature without any significant processing. For example, location data indicative of a location can be a feature, where in some instances, the location data can be processed to determine other features, such as average distance between locations, average time between traveling to different locations, among others, and these features can be included as part of the set of features or feature vector.

In step 304, the set of available features are compared against a model representative of the user to generate an overall score or confidence value. In this instance, comparing the set of available features can include taking the set of available features as inputs to a single model, and incorporating weights into the model as the weights are learned during use or training of the model.

In other instances, the set of available features can be compared against multiple models (e.g., a model for each feature) to determine individual model scores, and the individual model scores can be weighted and combined to generate a single overall score or confidence value. In this instance, the multiple models can include expected values and an allowable variance from the expected value, and the set of available features can be compared to a corresponding expected value of the model using at least one comparison algorithm to generate the individual model score. In accordance with an embodiment, the individual model score can be represented as a value from "0" to "1", "1" representing a high similarity, and "0" representing a mismatch. The individual model scores can be an input to a function/algorithm, such as an exponential model that takes as input empirical data, such as that from sensors, and identifies relationships between the data to make a prediction based on new data. It should be noted that any function, algorithm or other decision process, such as a decision tree, can be used to determine whether the device in use, is being utilized by an authorized user.

In accordance with various embodiments, the weights can be determined in a number of ways. For example, in one instance, scores determined to be more important (i.e., the score is more useful in identifying the owner of the device) can be weighted higher than scores determined to less important in identifying the owner of the device. A log or record of a number of instances of each model used can be maintained, where the weight applied to a score can be based at least on the record associated with each model used to generate the score. For example, if it is determined that the owner of the device frequently travels (e.g., based on travel patterns and frequency of travel), then the score associated with device location model can be weighted low since detecting the device in a new location would not be indicative that the device is being used by another. However, if it is determined that the owner of the device rarely travels outside a particular area (i.e., only travels to certain locations), the model associated with device location would be more indicative of whether the device is in the owner's possession. In this situation, the model associated with device location can be weighted high, since detecting that the device is in a new location would be indicative that the device is being used by someone other than the owner of the device.

In step 306, the overall score (or confidence value) is generated based at least in part on the comparing. The overall score or confidence value is indicative of a likelihood that the current user operating the computing device is an authorized user, such as an owner, of the computing device. As described above, generating the confidence value can include comparing the set of available features to multiple models (e.g., a model for each feature) to generate a plurality individual model scores, and the individual model scores can be weighted and combined to generate a single overall score or confidence value.

For example, assume at least three features are derived from a device that has three sensors (touchscreen, camera, microphone, etc.), where the features can be an ear imprint, a facial image, and voice data respectively. Each of the features can be compared to corresponding models associated with an authorized user (such as an owner) of the device. That is, a current ear imprint can be compared to a model ear imprint, a current facial image can be compared to a model facial image, and current voice data can be compared to model voice data. The result of each comparison can be a value between "0" and "1" or a value of "0" or "1", and each result can be an input to a function/algorithm, such as an exponential model that takes as input empirical data, such as that from sensors, and identifies relationships between the data to make a prediction based on new data. In this way, for each use of the device, features derived from sensor data during a current use of the device can be compared to corresponding model. The result of each comparison can be an input to an exponential model, each input being weighted, and the exponential model can generate a single overall score or confidence value indicative of a likelihood that the current user operating the computing device is the owner (or authorized user) of the computing device.

At step 308, the overall score or confidence value is compared to a number of confidence thresholds, and the type of access granted and/or security action performed can correspond to the determined confidence value and/or the confidence thresholds that were, or were not, met. For example, in step 310, the current user is provided access to at least a portion of functionality of the computing device based at least upon the confidence value meeting a first confidence threshold. As described above, providing access to a portion of functionality can include, e.g., granting access to certain data stored on the device, granting access to certain programs on the device, etc. In the case where the user is granted full access, the user can access all functionality of the device. In the case where the user is granted partial access, the user may be able to access certain features or applications of the device, such as a phone application to make a call, but may not be able to access other features or applications of the device, such as system preferences, a photo application, etc.

In step 312, a security action is performed when the confidence value does not at least meet a second confidence threshold, and the user is granted no access to the device. Performing a security action can include disabling the device, sending an email, text message, or some other notification to the owner of the device, calling another phone number, requiring the current user to enter an authentication measure, such as requiring the user to enter a passcode, a picture, voice data, biometric data, for use in authenticated the user. As described above, upon successfully responding to the security action, the user can be granted access to at least some level of functionality of the device; otherwise, the user is granted no access to the device.

Figure 4:
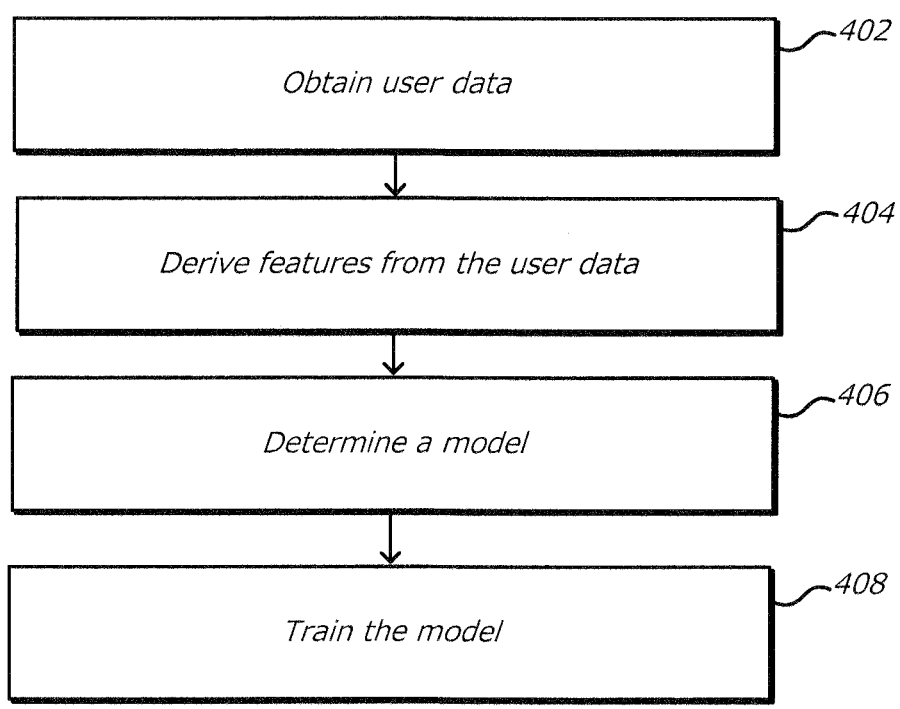
FIG. 4 illustrates an example process for determining a model, in accordance with various embodiments.

FIG. 4 illustrates an example process for determining a user model, in accordance with various embodiments. As described above, in one instance, the set of available features can be compared to multiple models (e.g., a model for each feature), while in other instances, a single model takes the set of available features as input. In any situation, a device may come with a default model generated from training data collected from a plurality of devices. The plurality of devices can be current devices in use, such as mobile phones, tablets, among others, that provide data (such as that described with regard to at least FIGS. 1A and 1B) to a central server that organizes the data, extracts relevant features, and builds the model.

At step 402, sensor data (e.g., training data) is obtained from a plurality of computing devices. The devices can be any device type, such as a mobile phone, a tablet, an electronic book reader, etc., and the training data can be obtained from devices operating in a way indicative of normal device use. For example, a provider or manufacturer of an electronic device, such as a mobile phone or tablet provider, can collect usage and other data from each device in operation, where the data can be voluntarily provided to the manufacturer.

At step 404, features are derived and organized by type from the collected sensor data. For example, training data for touch input data is group together, training data for location data is grouped together, etc. At step 406, the training data is used to determine a model, where default weight values are selected to maximize ability to predict when a device has been stolen. In accordance with an embodiment, the model can include one or more sub models (e.g., a model for each feature), where the training data can be used to determine the model and sub models.

Thereafter, while the device is being used, a set of available features can be compared against the model. In other embodiments, the set of available features can be compared against multiple models (e.g., a model for each feature). In any situation, an overall score, such as a confidence value, is generated based at least in part on the comparing, and the overall score can be used to determine whether the device has been stolen.

At step 408, while the device is being used the model can be adjusted and/or tailored to how the user uses the device. For example, when it is determined that the owner is using the device, features determined during each use can be used to update the model. In this way, as the user uses or otherwise changes the way in which they interact or operate the device, the model can be modified to reflect the use or change in use to more accurately recognize the user. By example, in the instance where a feature corresponds to location data, each time a new location is determined, the location can be added to a feature vector representative of location information. Thereafter, the obtained features can be used to modify the user model corresponding to location data to account for the new location.

In accordance with an embodiment, there can be different versions of default models, where the versions can be based on provided user preferences. For example, when a user first uses a device, the user can be presented a number of questions. The questions can be used to obtain user preference data, such travel frequency, age, application use, etc. The user preference data can be used to select a model that can maximize the ability to predict when a device has been stolen.

In other embodiments, the default model can be based at least on user permissions that enable the collecting of certain sensor data. However, in certain situations, sensor data not permitted by the user permissions may be obtained. For example, if it is determined that the device has been stolen, image, video, and/or location data not otherwise permitted to be collected may, while it is determined that the device is stolen, be obtained. Thus, while the owner of the device may not permit certain data to obtained while they use the device, such information may provide useful in retrieving or otherwise protecting personal information when the device is stolen.

In various embodiments, the default model can be selected based on sensors available to the device. In this way, the model is selected based on the sensor data that can be obtained from the available sensors. For example, some devices may not include an accelerometer, gyroscope, or other sensor, and thus, will not be able to collect data from such sensors. Accordingly, a default model can be selected that can utilize sensor data obtained from the available sensors. In accordance with various embodiments, any number of authorized users can be granted access to the device, where each authorized user can be associated with a profile having a particular module. For example, a parent can create a profile for "children", where the profile can include limitations as to which content and/or applications are accessible. It should be noted that in any situation, a single default model, a model having multiple sub models, or an owner defined profile can be adjusted based on use of the device to expand the realm of allowable ranges for each use of the device. For example, a first use of the device can be compared to a default model. As the owner uses the device, the model can be tailored based at least on the owner's use, and the tailored model can be used in subsequent comparisons.

Figure 5:
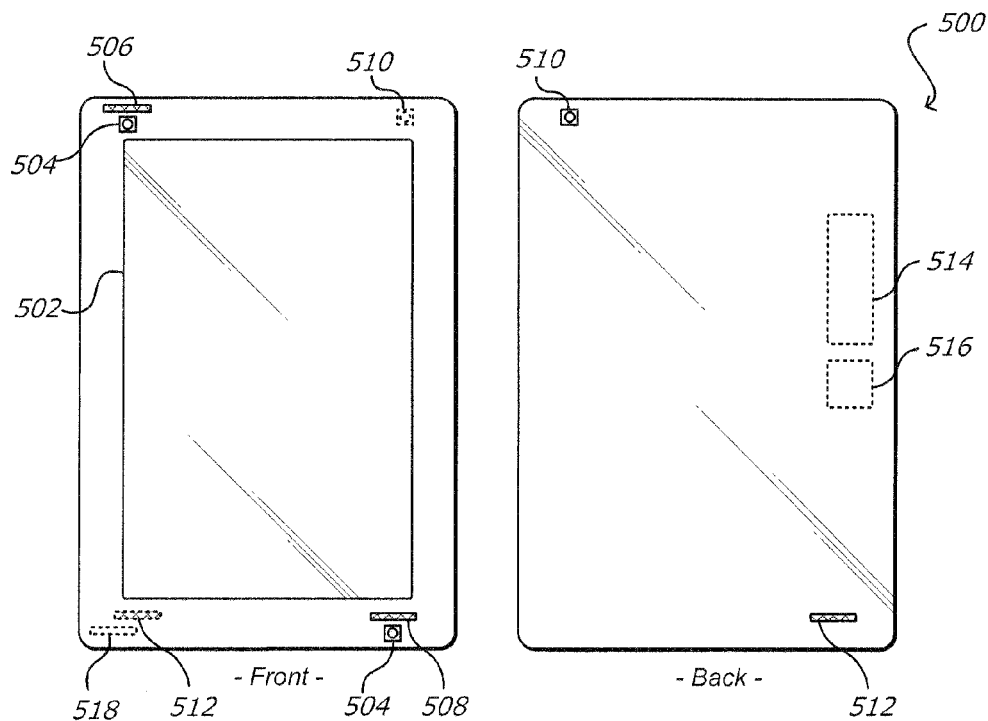
FIG. 5 illustrates front and back views of an example portable computing device that can be used in accordance with various embodiments.

FIG. 5 illustrates front and back views of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, electronic gyroscopes, and electronic compasses.

The example device also includes at least one communication mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
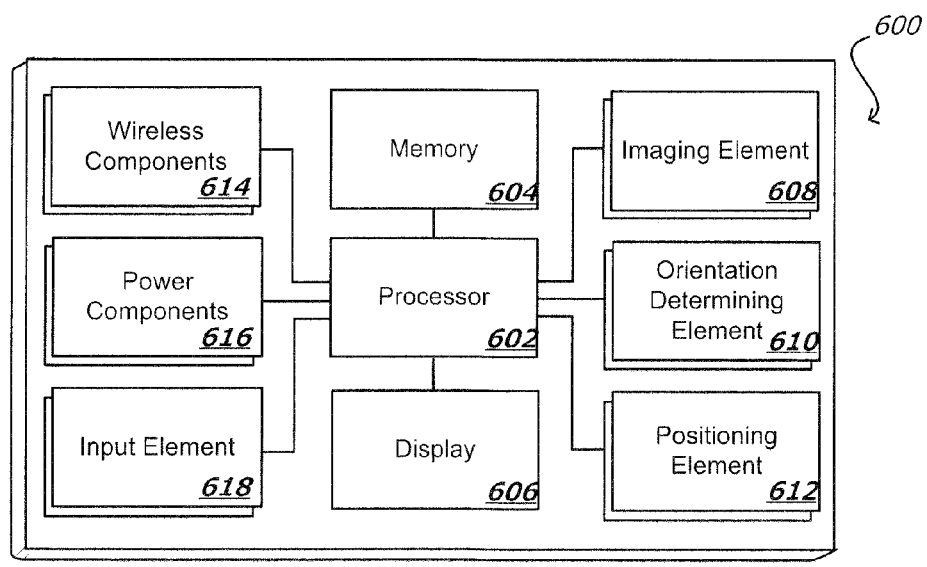
FIG. 6 illustrates an example set of basic components of a portable computing device, such as the device described with respect to FIG. 5.

FIG. 6 illustrates a set of basic components of an electronic computing device 600 such as the device 500 described with respect to FIG. 5. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of communication approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 618 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 7:
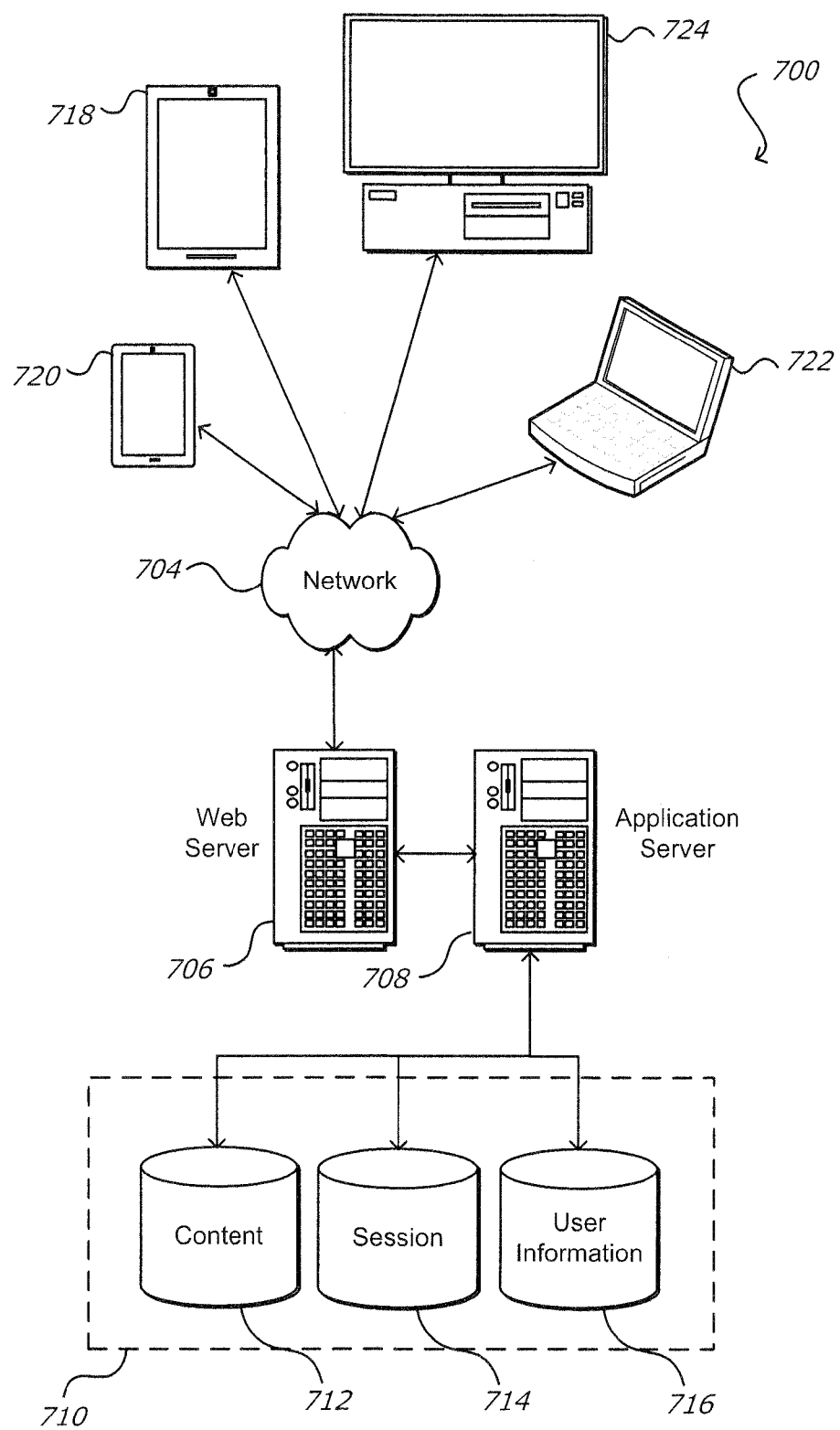
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes electronic client devices 718, 720, 722, and 724, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client devices 718, 720, 722, and 724 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 718, 720, 722 and 724. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for determining a user of a computing device, comprising:
   receiving by a first computing device permission from at least one authorized user of the first computing device to capture sensor data using one or more first sensors of the first computing device for user authentication;
   capturing first sensor data using the one or more first sensors;
   determining a set of features from the first sensor data, at least one of the features relating to at least one of a location of the first computing device, an identity of a current user of the first computing device, or an application usage pattern of the current user;
   generating a score based at least in part by comparing the set of features to a model associated with the at least one authorized user, the score indicative of a likelihood that the set of features corresponds to an unauthorized user;
   providing the current user with access to at least a portion of functionality of the first computing device based at least in part on the score meeting a first threshold;
   capturing second sensor data using one or more second sensors of the first computing device for which no permission has been granted for user authentication in response to determining that the score fails to meet a second threshold;
   determining at least one of the location of the first computing device, the identity of the current user, or the application usage pattern based at least in part on the second sensor data; and
   sending at least one of the location of the first computing device, the identity of the current user, or the application usage pattern to a second computing device associated with the at least one authorized user.

2. The computer implemented method of claim 1, further comprising:
   locking access to at least a second portion of the functionality of the first computing device; and
   prompting for a credential for accessing at least the second portion of the functionality of the first computing device.

3. A computer implemented method, comprising:
   receiving by a first computing device permission from at least one authorized user of the first computing device to capture sensor data using one or more first sensors of the first computing device;
   capturing first sensor data using the one or more first sensors;
   determining a set of features from the first sensor data;
   comparing the set of features against at least one model associated with the at least one authorized user to generate a score that is indicative of a likelihood that the set of features corresponds to the at least one authorized user;
   capturing second sensor data using one or more second sensors of the first computing device for which no permission has been granted in response to determining that the score does not at least meet a specified threshold; and
   sending information corresponding to the second sensor data to a second computing device associated with the at least one authorized user.

4. The computer implemented method of claim 3, further comprising:
   determining that the score meets a second specified threshold; and
   providing access to at least a portion of functionality of the first computing device.

5. The computer implemented method of claim 3, wherein comparing the set of features includes:
   comparing each feature in the set of features to corresponding model data to determine a plurality of scores; and
   determining an overall score based at least in part on the plurality of scores.

6. The computer implemented method of claim 5, further comprising:
   maintaining a log of at least one feature; and
   determining the overall score based at least in part on the log of at least one feature.

7. The computer implemented method of claim 3, wherein the set of features includes a touch pattern of a user of the first computing device, an image of the user, a voice pattern of the user, or an application usage pattern of the user.

8. The computer implemented method of claim 3, wherein the sensor data is obtained from at least one of an accelerometer, a gyroscope, a camera, a touch screen, a GPS, or a microphone.

9. The computer implemented method of claim 3, further comprising:
   determining that a user is a second authorized user of the first computing device;
   determining a second set of features associated with the user operating the first computing device over a period of time;
   monitoring the second set of features; and
   modifying a second model based at least in art on the second set of features.

10. The computer implemented method of claim 3, further comprising:
    receiving an indication of a new user of the first computing device;
    determining, based at least in art on third sensor data obtained from the first computing device, a second set of features associated with the new user;
    comparing the second set of features against a default model to generate a second score; and
    providing the new user with access to at least a portion of functionality of the first computing device based at least in part on the second score meeting a threshold.

11. The computing implemented method of claim 3, further comprising:
    prompting for a credential for access to at least a portion of functionality of the first computing device; and
    providing access to at least the portion of functionality of the first computing device based at least in part on the credential.

12. The computer implemented method of claim 11, wherein the credential includes at least one of a pin code, a voice sample of a user, an image of the user, a respective response to a one or more security questions, or a gesture.

13. The computer implemented method of claim 3, wherein one feature in the set of features is first voice data, and wherein comparing the set of features includes:
    comparing the first voice data to corresponding model data representing second voice data of the at least one authorized user to generate at least one sub-score; and
    determining an overall score based at least in part on the at least one sub-score.

14. A computing system, comprising:
at least one processor; and
memory including instructions that, when executed by the processor, cause the computing system to:
determine, based at least in part on authorized user permissions, permitted sensor data associated with a first sensor of a computing device;
determine, based at least in part on the authorized user permissions, unpermitted sensor data associated with a second sensor of the computing device;
determine a set of features from the permitted sensor data;
compare the set of features against at least one model associated with at least one authorized user of the computing device to generate a score that is indicative of a likelihood that the set of features corresponds to the at least one authorized user;
capture the unpermitted sensor data in response to determining that determine that the score does not at least meet a specified threshold; and
perform a security action.

15. The computing system of claim 14, wherein the instructions, when executed, further cause the computing device to:
determine that the score meets a second specified threshold; and
provide access to at least a portion of functionality of the computing device.

16. The computing system of claim 14, wherein the instructions, when executed, further cause the computing device to:
determine that a user is a second authorized user of the computing device;
determine a second set of features associated with the user operating the computing device over a period of time; and
modify a second model based at least in part on the second set of features.

17. The computing system of claim 14, wherein one feature in the set of features is a first usage pattern for receiving a call, and wherein the instructions, when executed to cause the computing device to compare the set of features, include causing the computing device to:
compare the first usage pattern for receiving a call to corresponding model data representing a second usage pattern for receiving a call by the at least one authorized user to generate at least one sub-score; and
determine an overall score based at least in part on the at least one sub-score.

18. The computing system of claim 14, wherein one feature in the set of features is a first image of at least a portion of an eye of the user, and wherein the instructions, when executed to cause the computing device to compare the set of features, include causing the computing device to:
compare the first image to corresponding model data representing a second image of an eye of the at least one authorized user to generate at least one sub-score; and
determine an overall score based at least in part on the at least one sub-score.

19. The computing system of claim 14, wherein one feature in the set of features is at least a portion of a face, and wherein the instructions, when executed to cause the computing device to compare the set of features, include causing the computing device to:
compare the portion of the face to corresponding model data representing at least a portion of a face of the at least one authorized user to generate at least one sub-score; and
determine an overall score based at least in part on the at least one sub-score.

20. A non-transitory computer readable storage medium storing one or more sequences of instructions executable by one or more processors to perform a set of operations comprising:
determining, based at least in part on authorized user permissions, permitted sensor data associated with a first sensor of a computing device;
determining, based at least in part on the authorized user permissions, unpermitted sensor data associated with a second sensor of the computing device;
determining a set of features from the permitted sensor data;
comparing the set of features against at least one model associated with at least one authorized user of the computing device to generate a score that is indicative of a likelihood that the set of features corresponds to the at least one authorized user;
capturing the unpermitted sensor data in response to determining that the score does not at least meet a specified threshold; and
performing a security action.

21. The non-transitory computer readable storage medium of claim 20, wherein the set of operations further comprises:
receiving an indication of a new user of the computing device;
determining, based at least in part on sensor data obtained from the computing device, a second set of features associated with the new user;
comparing the second set of features against a default model to generate a second score; and
providing the new user with access to at least a portion of functionality of the computing device based at least in part on the second score meeting a threshold.

22. The non-transitory computer readable storage medium of claim 20, wherein the set of operations further comprises:
determining that the score meets a second specified threshold; and
providing access to at least a portion of functionality of the computing device.

23. The non-transitory computer readable storage medium of claim 20, wherein one feature in the set of features is location data, and wherein comparing the set of features includes:
comparing the location data to corresponding model data representing a record of previous location data of the at least one authorized user to generate at least one sub-score; and
determining an overall score based at least in part on the at least one sub-score.

24. The non-transitory computer readable storage medium of claim 20, wherein one feature in the set of features is mobile network data, and wherein comparing the set of features includes:
comparing the mobile network data to corresponding model data representing a record of previous mobile network data of the at least one authorized user to generate at least one sub-score; and
determining an overall score based at least in part on the at least one sub-score.

* * * * *